US009794434B2

(12) United States Patent
Tanba et al.

(10) Patent No.: US 9,794,434 B2
(45) Date of Patent: Oct. 17, 2017

(54) IMAGE FORMING APPARATUS INCLUDING A PREVIEW DISPLAY UNIT AND NON-TRANSITORY COMPUTER-READABLE STORAGE MEDIUM STORING IMAGE FORMING PROGRAM

(71) Applicant: KYOCERA Document Solutions Inc., Osaka (JP)

(72) Inventors: Masato Tanba, Osaka (JP); Akira Kaminogo, Osaka (JP); Yoshihiko Arai, Osaka (JP); Yuri Moritani, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/069,464

(22) Filed: Mar. 14, 2016

(65) Prior Publication Data

US 2016/0295030 A1 Oct. 6, 2016

(30) Foreign Application Priority Data

Mar. 31, 2015 (JP) ................................ 2015-072666

(51) Int. Cl.
*G06F 17/00* (2006.01)
*H04N 1/00* (2006.01)
*G06F 3/12* (2006.01)
*G06F 3/0488* (2013.01)
*G06F 3/0484* (2013.01)

(52) U.S. Cl.
CPC ....... *H04N 1/0044* (2013.01); *G06F 3/04845* (2013.01); *G06F 3/04883* (2013.01); *G06F 3/04886* (2013.01); *G06F 3/1208* (2013.01); *G06F 3/1256* (2013.01); *H04N 1/00411* (2013.01); *H04N 1/00469* (2013.01); (Continued)

(58) Field of Classification Search
None
See application file for complete search history.

(56) References Cited

U.S. PATENT DOCUMENTS 4,751,507 A * 6/1988 Hama ................... G09G 5/391
345/661
6,184,859 B1 * 2/2001 Kojima ................ G06F 3/0481
345/629

(Continued)

FOREIGN PATENT DOCUMENTS

JP 2009/302759 A 12/2009

*Primary Examiner* — Mustafa Amin
(74) *Attorney, Agent, or Firm* — Stein IP, LLC (57) ABSTRACT

Provided are an image forming apparatus capable of setting a printing size of a margin by using a preview displayed in an enlarged manner, and a non-transitory computer-readable storage medium. When a pinch-in operation performed with respect to a particular region at a left end in a whole page preview displayed on a display section has been accepted, an MFP displays a left end preview in an enlarged manner to be larger in size than the particular region at the left end in the whole page preview. When a left-to-right swipe operation performed with respect to the displayed left end preview has been accepted, the MFP sets a size specified by the swipe operation as a printing size of a margin of a page as a target of the preview, and displays a whole page preview and a left end preview, both reflecting a margin having the set size.

8 Claims, 12 Drawing Sheets

(52) U.S. Cl.
CPC .............. *G06F 2203/04806* (2013.01); *H04N 2201/0094* (2013.01)

(56) References Cited

U.S. PATENT DOCUMENTS

| | | | | |
|---|---|---|---|---|
| 8,570,346 | B2* | 10/2013 | Mikawa | G06T 3/40 345/629 |
| 8,947,754 | B2* | 2/2015 | Kashiwa | H04N 1/00411 348/333.12 |
| 2003/0065590 | A1* | 4/2003 | Haeberli | G06Q 30/0621 705/26.5 |
| 2003/0194148 | A1* | 10/2003 | Haeberli | G06T 11/60 382/283 |
| 2004/0105127 | A1* | 6/2004 | Cudd | G06F 17/212 358/1.18 |
| 2004/0252286 | A1* | 12/2004 | Murray | H04N 1/00167 355/28 |
| 2008/0030818 | A1* | 2/2008 | Nagahara | H04N 1/3873 358/537 |
| 2012/0246566 | A1* | 9/2012 | Shiraga | G06F 3/1205 715/274 |
| 2013/0188218 | A1* | 7/2013 | Rajesh | G06F 3/1292 358/1.15 |
| 2016/0065763 | A1* | 3/2016 | Kawaguchi | H04N 1/00469 358/1.2 |
| 2016/0072966 | A1* | 3/2016 | Koue | H04N 1/0044 358/1.15 |

\* cited by examiner

IMAGE FORMING APPARATUS INCLUDING A PREVIEW DISPLAY UNIT AND NON-TRANSITORY COMPUTER-READABLE STORAGE MEDIUM STORING IMAGE FORMING PROGRAM

INCORPORATION BY REFERENCE

This application is based upon the corresponding Japanese Patent Application No. 2015-072666 filed on Mar. 31, 2015, the entire contents of which are incorporated herein by reference.

BACKGROUND

The present disclosure relates to an image forming apparatus that performs printing on a recording medium and also relates to a non-transitory computer-readable storage medium in which a program for image formation is stored.

In displaying on a display device a preview of a page to be printed, a typical image forming apparatus displays a preview of a particular region in a preview of a whole page such that the preview of the particular region is larger in size than the particular region in the preview of the whole page.

However, in such a typical image forming apparatus, although it is possible to display a preview of a particular region in an enlarged manner, the preview displayed in an enlarged manner is used only for the purpose of confirming print contents.

SUMMARY

According to one aspect of the present disclosure, an image forming apparatus includes a preview display unit that performs processing of displaying, on a display device, a whole page preview of a page to be printed, an operation accepting unit that performs processing of accepting an operation performed via an operation device with respect to the whole page preview displayed by the preview display unit, and a processing performing unit that performs processing corresponding to the operation accepted by the operation accepting unit. Here, when the operation accepting unit has accepted an operation for enlarged display performed with respect to a particular region at an end in the whole page preview that has been displayed by the preview display unit, the processing performing unit performs processing of making the preview display unit display a preview of the particular region in an enlarged manner to be larger in size than the particular region in the whole page preview. When the operation accepting unit has accepted a margin specifying operation for specifying a printing size of a margin of the page performed with respect to the preview of the particular region that has been displayed by the preview display unit, the processing performing unit sets a size specified in the margin specifying operation as a printing size of a margin of the page as a target of the whole page preview, and the processing performing unit performs processing of making the preview display unit display at least one of the whole page preview and the preview of the particular region, both reflecting a margin having the size set by the processing performing unit.

According to another aspect of the present disclosure, a non-transitory computer-readable storage medium stores an image forming program executable on a computer installed in an image forming apparatus. The image forming program, when executed, causes the computer to operate as a preview display unit that displays, on a display device, a whole page preview of a page to be printed, an operation accepting unit that accepts an operation performed via an operation device with respect to the whole page preview displayed by the preview display unit, and a processing performing unit that performs processing corresponding to an operation accepted by the operation accepting unit. Here, when the operation accepting unit has accepted an operation for enlarged display performed with respect to a particular region at an end in the whole page preview displayed by the preview display unit, the operation performing unit makes a preview of the particular region be displayed by the preview display unit in an enlarged manner to be larger in size than the particular region in the whole page preview. When the operation accepting unit has accepted a margin specifying operation for specifying a printing size of a margin of the page performed with respect to the preview of the particular region displayed by the preview display unit, the processing performing unit sets a size specified in the margin specifying operation as a printing size of a margin of the page as a target of the whole page preview, and the processing performing unit makes at least one of the whole page preview and the preview of the particular region, both reflecting a margin having the size set by the processing performing unit, be displayed by the preview display unit.

DETAILED DESCRIPTION

Descriptions will be given below of an embodiment of the present disclosure with reference to the accompanying drawings.

First, a description will be given of a configuration of a multifunction peripheral (MFP) as an image forming apparatus according to the present embodiment.

Figure 1:
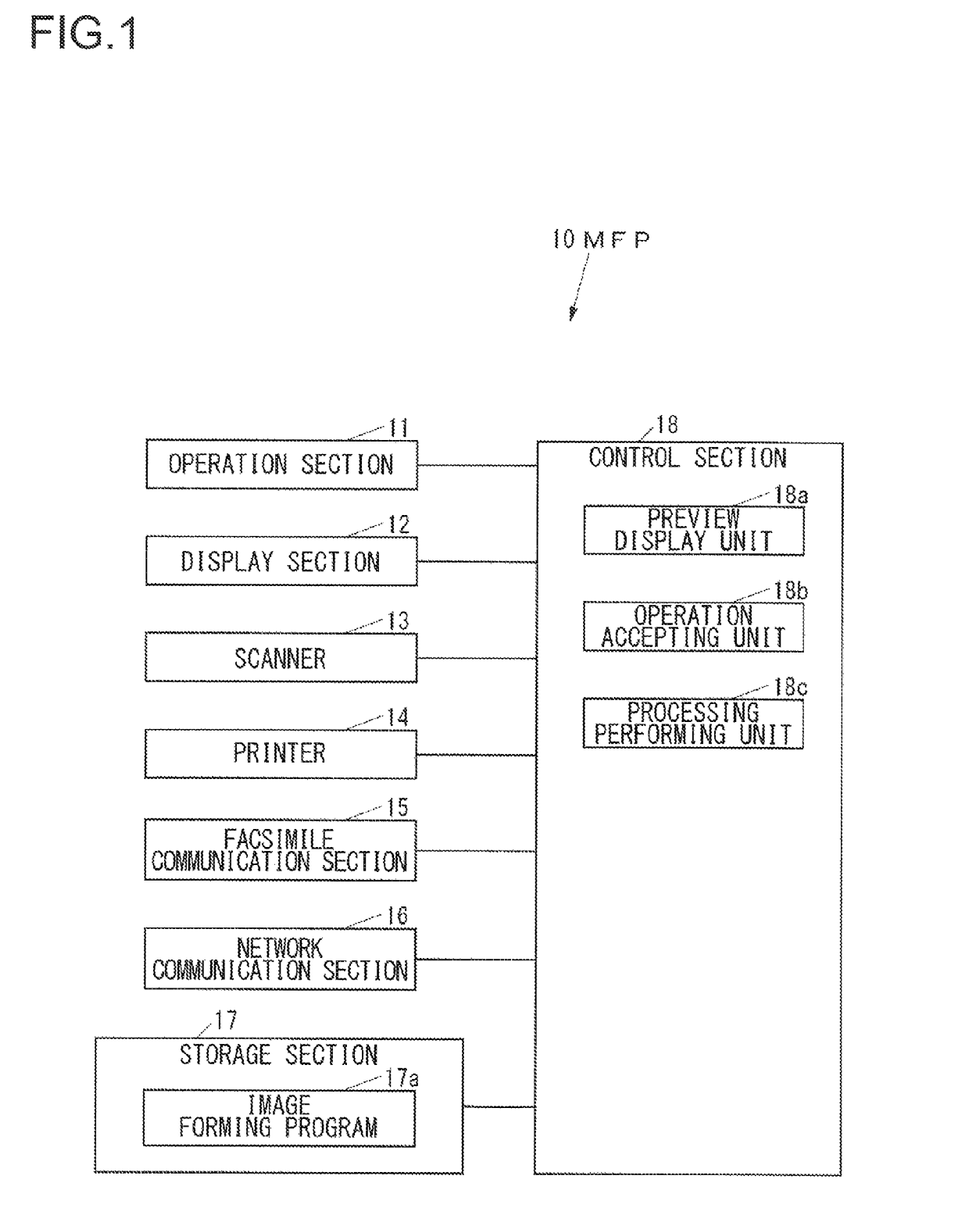
FIG. 1 shows a configuration of a multifunction peripheral (MFP) according to an embodiment of the present disclosure.

FIG. 1 shows a configuration of an MFP 10 according to the present embodiment.

As shown in FIG. 1, the MFP 10 includes an operation section 11 that is an input device including buttons, for example, to which various operations are inputted, a display section 12 that is a display device such as a liquid crystal display (LCD) and displays information of various kinds, a scanner 13 that is a reading device that reads an image from a document, a printer 14 that is a printing device that performs printing with respect to a recording medium such as a sheet of paper, a facsimile communication section 15 that is a facsimile device that performs facsimile communication with an external facsimile device via a communication line such as a public telephone line, a network communication section 16 that is a network communication device that performs communication with an external device via a network such as a local area network (LAN) and the Internet, a storage section 17 that is a nonvolatile storage device, such as an electrically erasable programmable read only memory (EEPROM) and a hard disk drive (HDD), that stores information of various kinds, and a control section 18 that controls the entire MFP 10.

At least part of the operation section 11 constitutes a touch panel together with the display section 12.

The storage section 17 is a memory that has a region where a program and data are stored. The storage section 17 stores an image forming program 17a for controlling the MFP 10. The image forming program 17a may be installed into the MFP 10 at a manufacturing stage of the MFP 10, may be additionally installed into the MFP 10 via an external storage medium such as an SD card or a universal serial bus (USB) memory, or may be additionally installed into the MFP 10 from a network.

The control section 18 includes, for example, a central processing unit (CPU), a read only memory (ROM) where a program and data of various kinds are stored, and a random access memory (RAM) that is used as a work area for the CPU. CPU executes a program stored in the ROM or in the storage section 17.

The control section 18 executes the image forming program 17a stored in the storage section 17, and thereby operates as a preview display unit 18a that displays, on the display section 12, a preview of a page to be printed, an operation accepting unit 18b that accepts an operation performed via the operation section 11 with respect to the preview that has been displayed by the preview display unit 18a, and as a processing performing unit 18c that performs processing corresponding to the operation accepted by the operation accepting unit 18b. The preview display unit 18a, the operation accepting unit 18b, and the processing performing unit 18c, which may each have a processor such as a central processing unit (CPU) which has one or a plurality of circuits, are able to read and execute various programs, and are also able to execute various preinstalled programs. Here, the one or a plurality of circuits may each be an electronic component constituted by a plurality of electronic elements connected to each other by wiring, or an electronic substrate to which a plurality of electronic components are connected.

Next, a description will be given of an operation of the MFP 10 (an image forming method).

Figure 2:
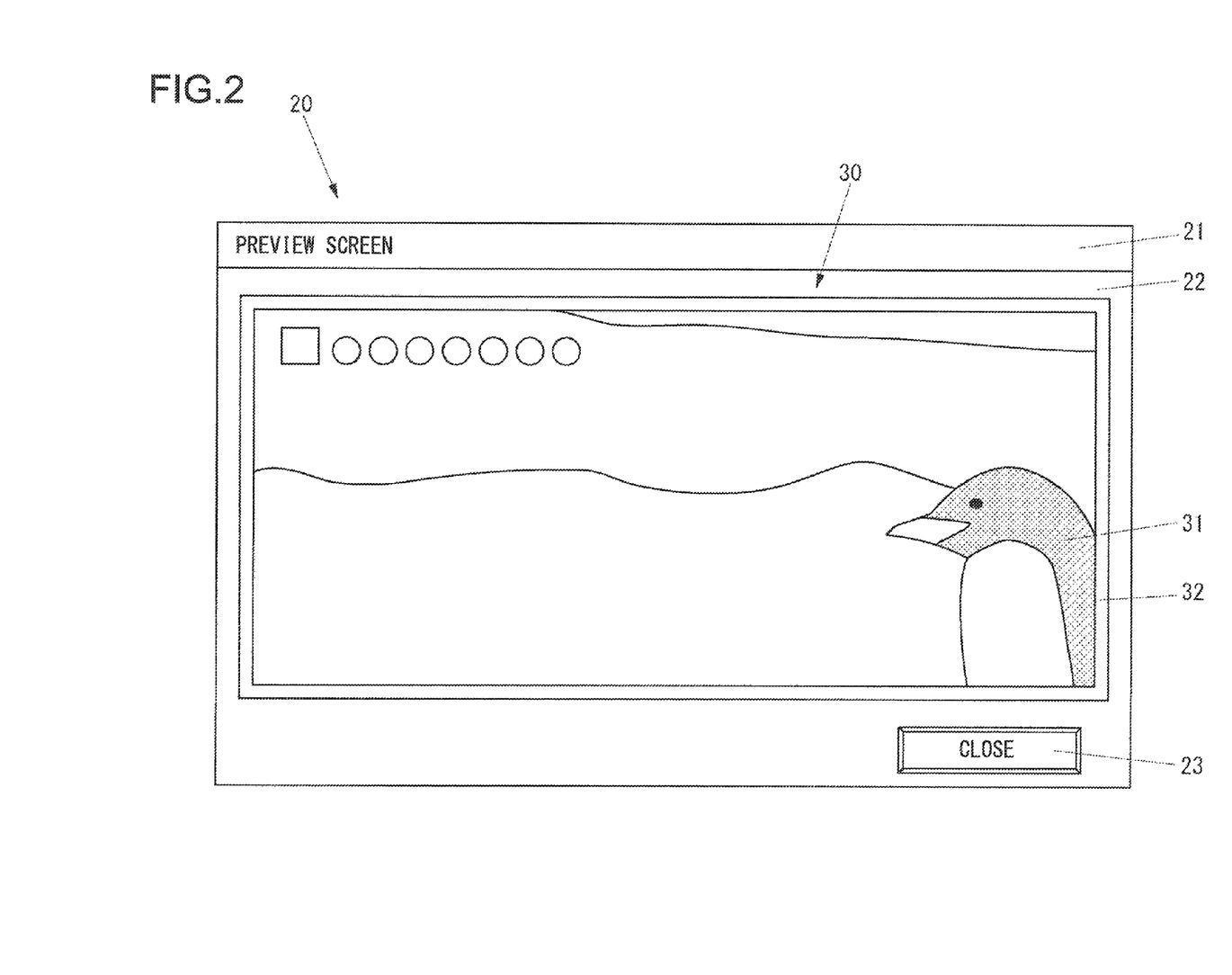
FIG. 2 shows an example of a preview screen displayed on the display section shown in FIG. 1.

When an image is read by the scanner 13, the preview display unit 18a displays a preview of the whole image read by the scanner 13 on the display section 12, that is, a preview of a whole page to be printed by the printer 14 (hereinafter referred to as a "whole page preview") in such a manner as shown in FIG. 2.

FIG. 2 shows an example of a preview screen 20 that the display section 12 is displayed.

The preview screen 20 shown in FIG. 2 includes a title bar 21, a display region 22 of the preview, and a button 23 for closing the preview screen 20.

In FIG. 2, a whole page preview 30 is displayed on the display region 22. The whole page preview 30 includes an image 31 read by the scanner 13. The whole page preview 30 can also include a printing margin 32 adjoining an end of the image 31.

By checking the whole page preview 30 shown in FIG. 2, a user is able to confirm a printing orientation of the image 31. By checking the whole page preview 30 shown in FIG. 2, the user is also able to approximately confirm whether an element in the image 31 such as a letter is collapsed or cut off at an end of the image 31, and a size of the margin 32.

Figure 3:
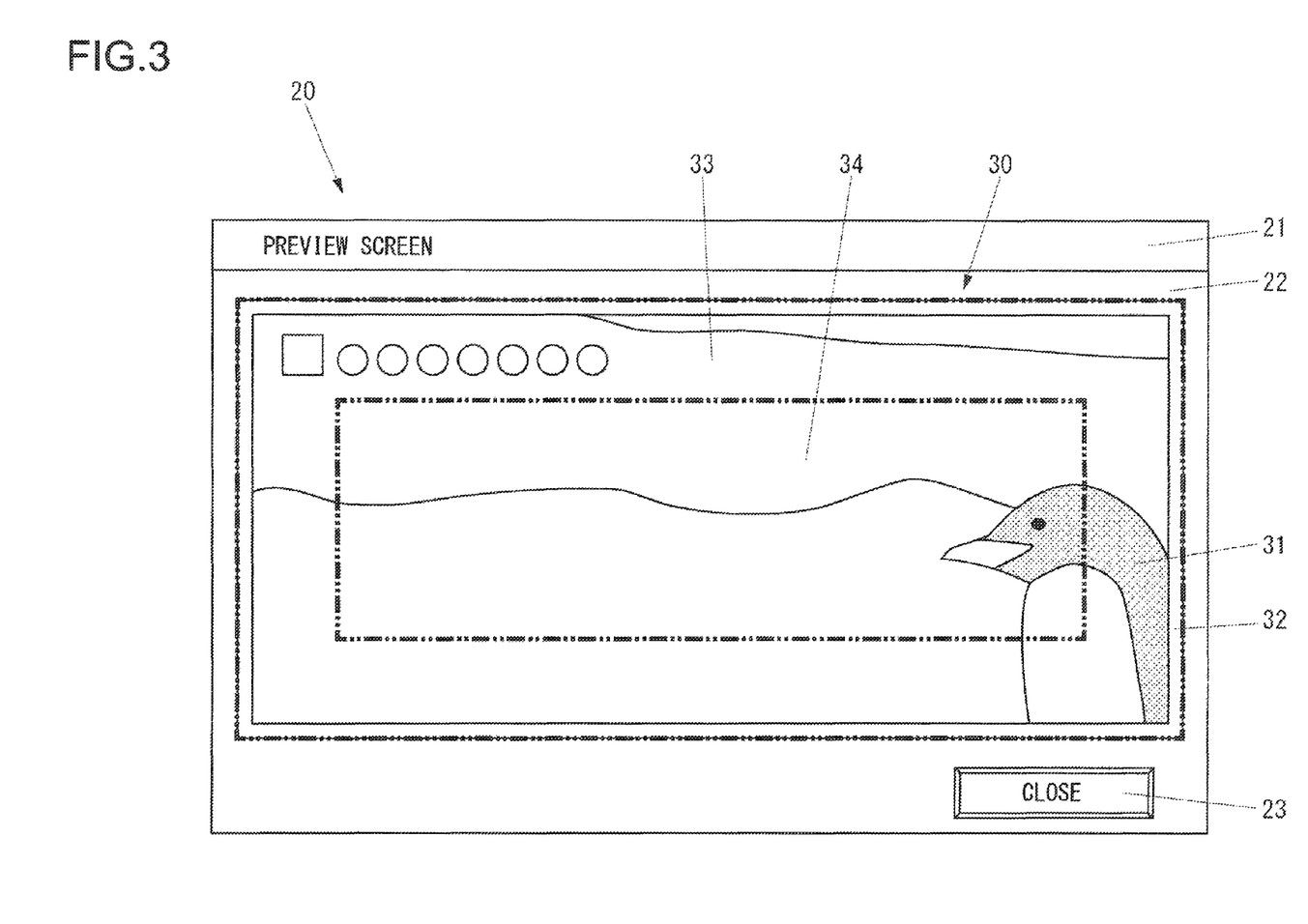
FIG. 3 shows an example of an end region in the whole page preview shown in FIG. 2.

FIG. 3 shows an example of an end region 33 in the whole page preview 30.

As shown in FIG. 3, the whole page preview 30 includes the end region 33 and a center region 34 surrounded by the end region 33. In FIG. 3, the two-dot chain line indicates a border between the regions, and is not actually displayed on the display section 12.

A width of the end region 33 can be set as necessary.

Figure 4:
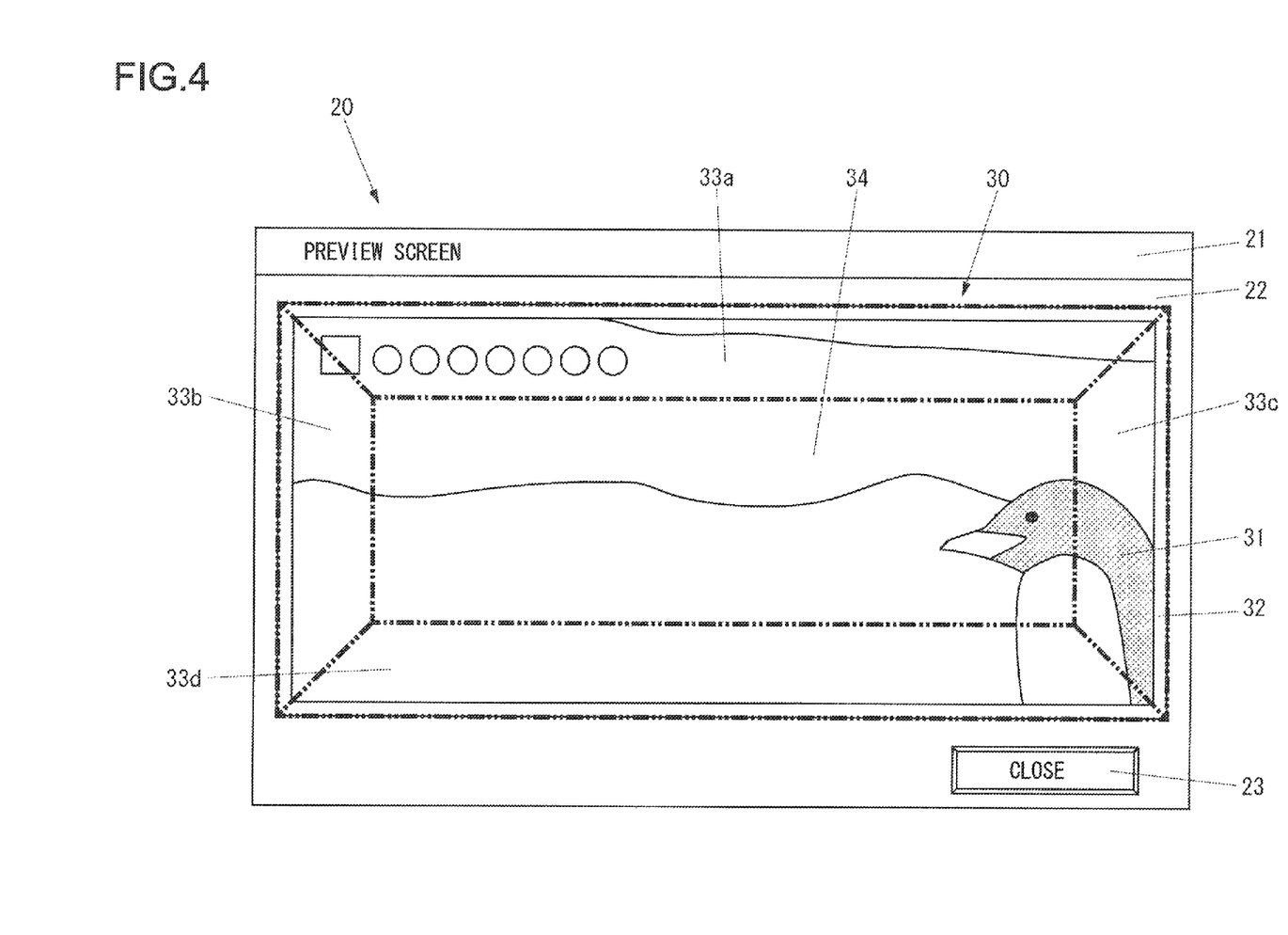
FIG. 4 shows an example of four operation regions in the end region shown in FIG. 3.

FIG. 4 shows an example of four operation regions 33a, 33b, 33c, and 33d in the end region 33.

As shown in FIG. 4, the end region 33 is divided into the operation region 33a disposed on an upper side for enlarged display of an upper end region, the operation region 33b disposed on a left side for enlarged display of a left end region, the operation region 33c disposed on a right side for enlarged display of a right end region, and the operation region 33d disposed on a bottom side for enlarged display of a bottom end region. In FIG. 4, the two-dot chain line indicates a border between the regions, and is not actually displayed on the display section 12.

Figure 5:
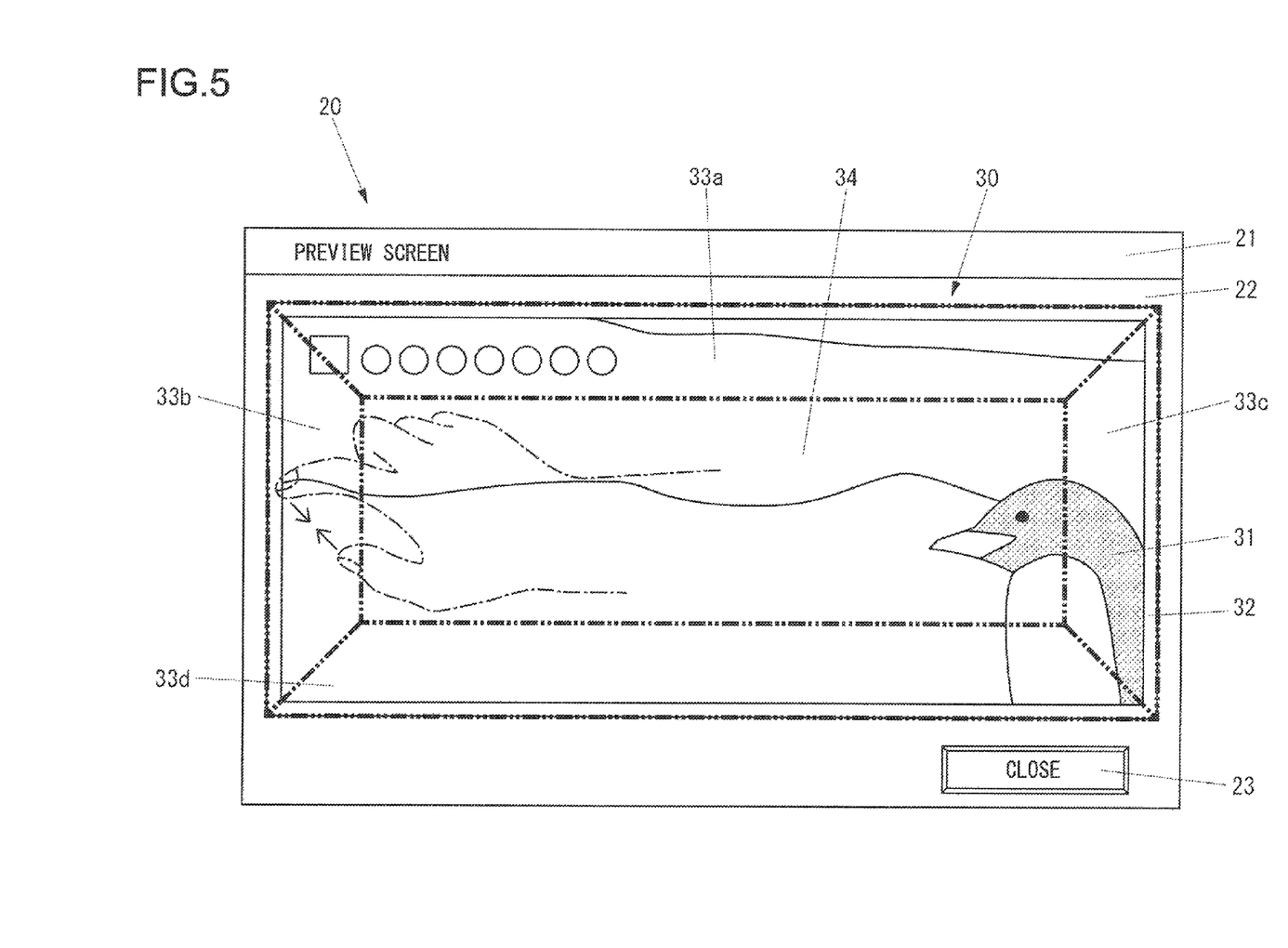
FIG. 5 shows an example of a pinch-in operation performed with respect to an operation region shown in FIG. 4.

FIG. 5 shows an example of a pinch-in operation performed with respect to the operation region 33b.

When a pinch-in operation is performed with respect to the operation region 33b as shown in FIG. 5, the operation accepting unit 18b accepts the pinch-in operation performed with respect to the operation region 33b.

Figure 6:
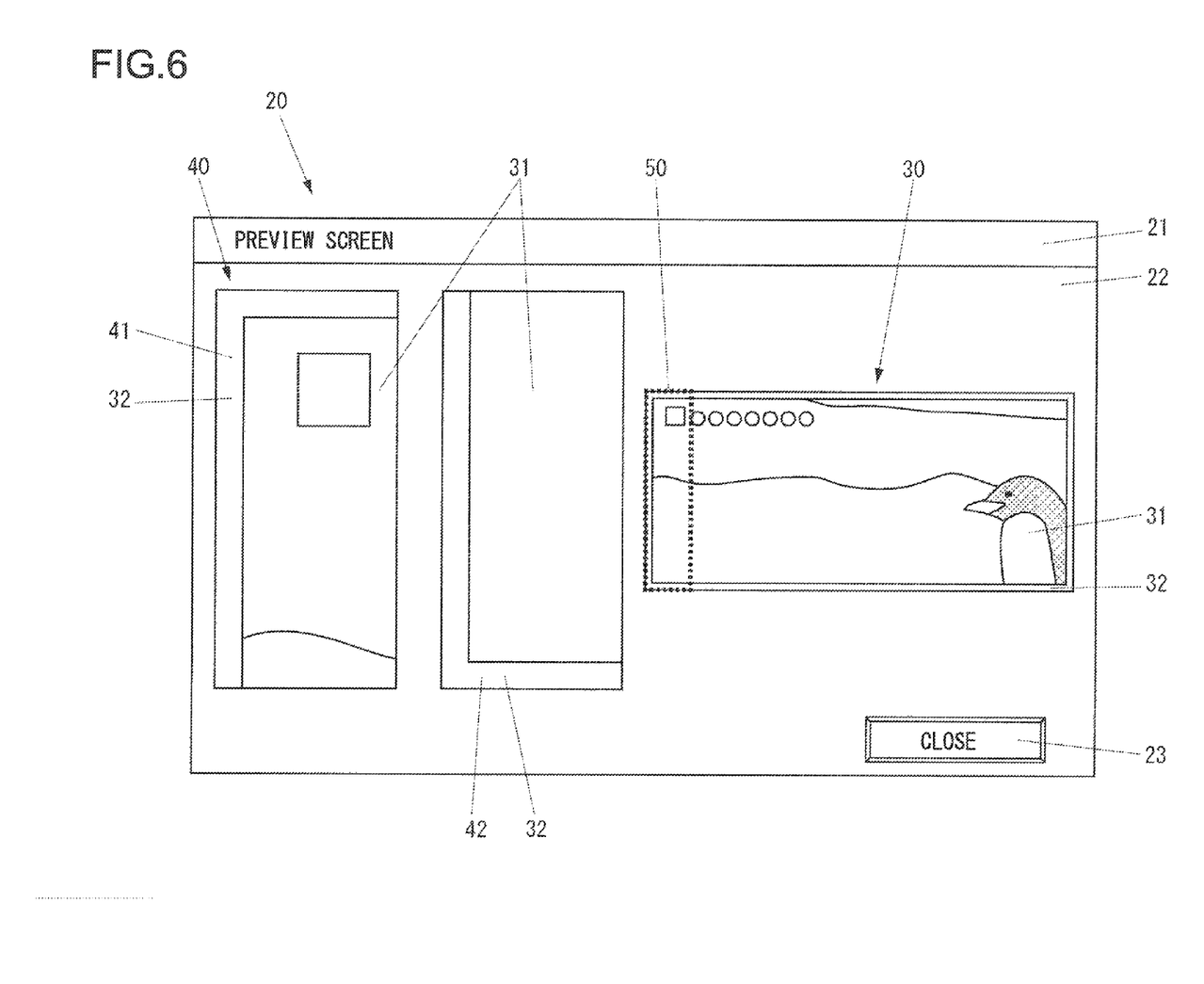
FIG. 6 shows an example of a preview screen displayed when the pinch-in operation shown in FIG. 5 performed with respect to the operation region has been accepted.

FIG. 6 shows an example of a preview screen 20 displayed when the pinch-in operation performed with respect to the operation region 33b has been accepted.

When a pinch-in operation as shown in FIG. 5 is performed with respect to the operation region 33b disposed on the left side in the whole page preview 30 displayed by the preview display unit 18a as shown in FIG. 2 and the pinch-in operation is accepted by the operation accepting unit 18b, the processing performing unit 18c, as shown in FIG. 6, makes the preview display unit 18a display a preview of the left end region (hereinafter referred to as a "left end preview") 40 in an enlarged manner to be larger in size than the left end region in the whole page preview 30.

Figure 7:
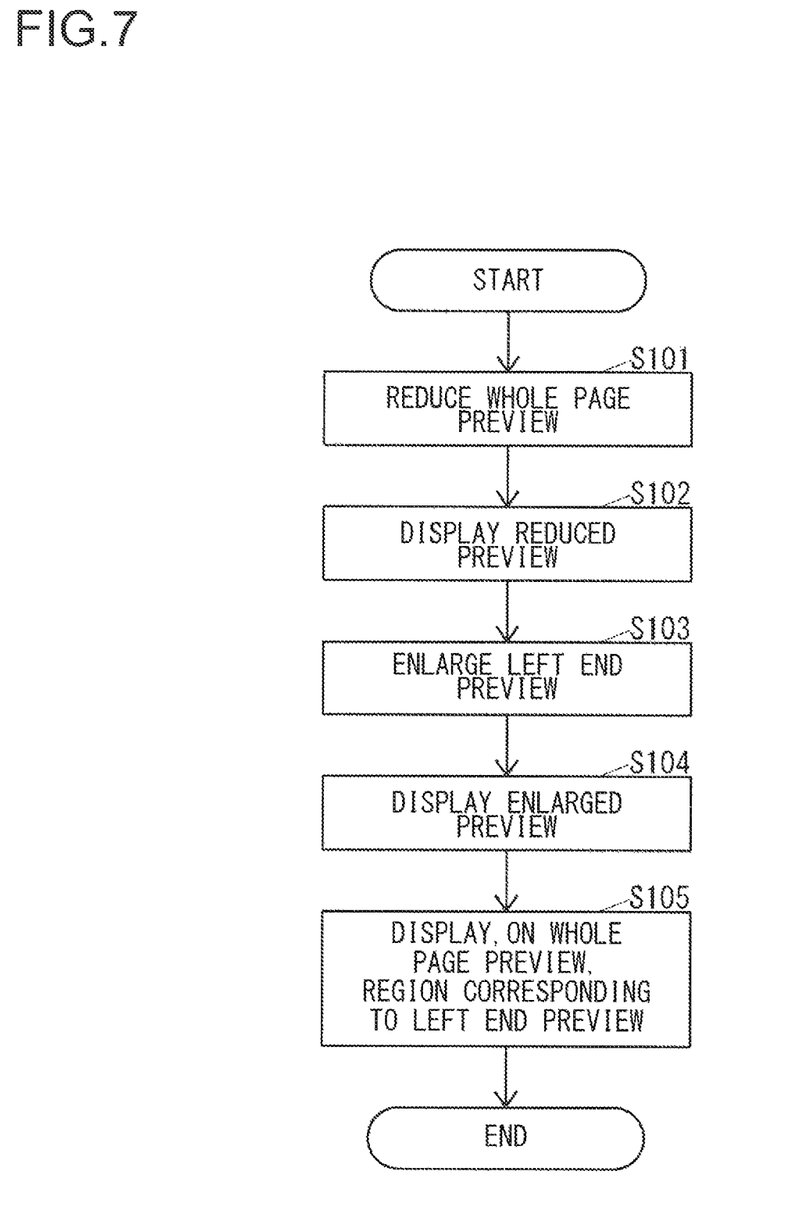
FIG. 7 shows steps of an operation performed by the preview display unit shown in FIG. 1 when the pinch-in operation performed with respect to the operation region has been accepted.

FIG. 7 shows steps of an operation performed by the preview display unit 18a when a pinch-in operation with respect to the operation region 33b has been accepted.

As shown in FIG. 7, the preview display unit 18a reduces the whole page preview 30 to be smaller than in FIG. 2 (S101), and displays the reduced whole page preview 30 on the right side of the display region 22 as shown in FIG. 6 (S102).

Then, the preview display unit 18a displays the left end preview 40 as a preview of the left end region in the region 33 (see FIG. 3) in such a manner that the left end preview 40 is larger in size than the left end region in the whole page preview 30 in FIG. 2 (S103), and displays the enlarged left end preview 40 on the left side of the display region 22 as shown in FIG. 6 (S104). Here, the left end preview 40 is divided into an upper-half block 41 showing an upper half of the left end region of the region 33 and a lower-half block 42 showing a lower half of the left end region of the region 33. The upper-half block 41 and the lower-half block 42 are displayed side by side in a right-left direction.

Next, the preview display unit 18a displays a broken line 50 on the whole page preview 30 to indicate a region corresponding to the left end preview 40 (S105), and ends the operation shown in FIG. 7.

By checking the left end preview 40 shown in FIG. 6, the user is able to confirm in a detailed manner whether an element in the image 31 such as a letter is collapsed or cut off at an end of the image 31, and the size of the margin 32.

Figure 8:
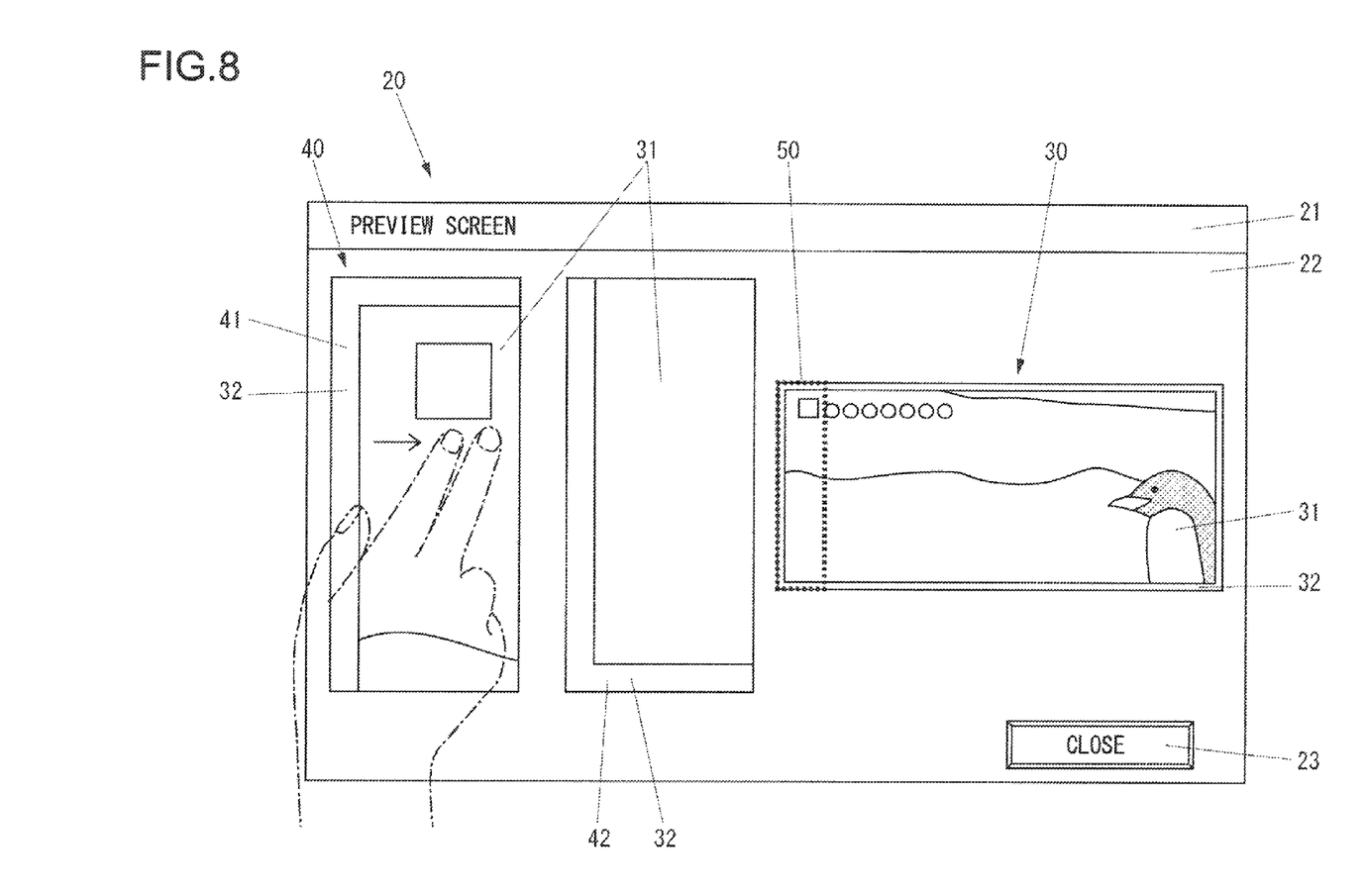
FIG. 8 shows an example of a swipe operation performed with respect to a left end preview shown in FIG. 6.

FIG. 8 shows an example of a swipe operation performed with respect to the left end preview 40.

As shown in FIG. 8, when a swipe operation is performed with respect to the left end preview 40, the operation accepting unit 18b accepts the swipe operation performed with respect to the left end preview 40.

Figure 9:
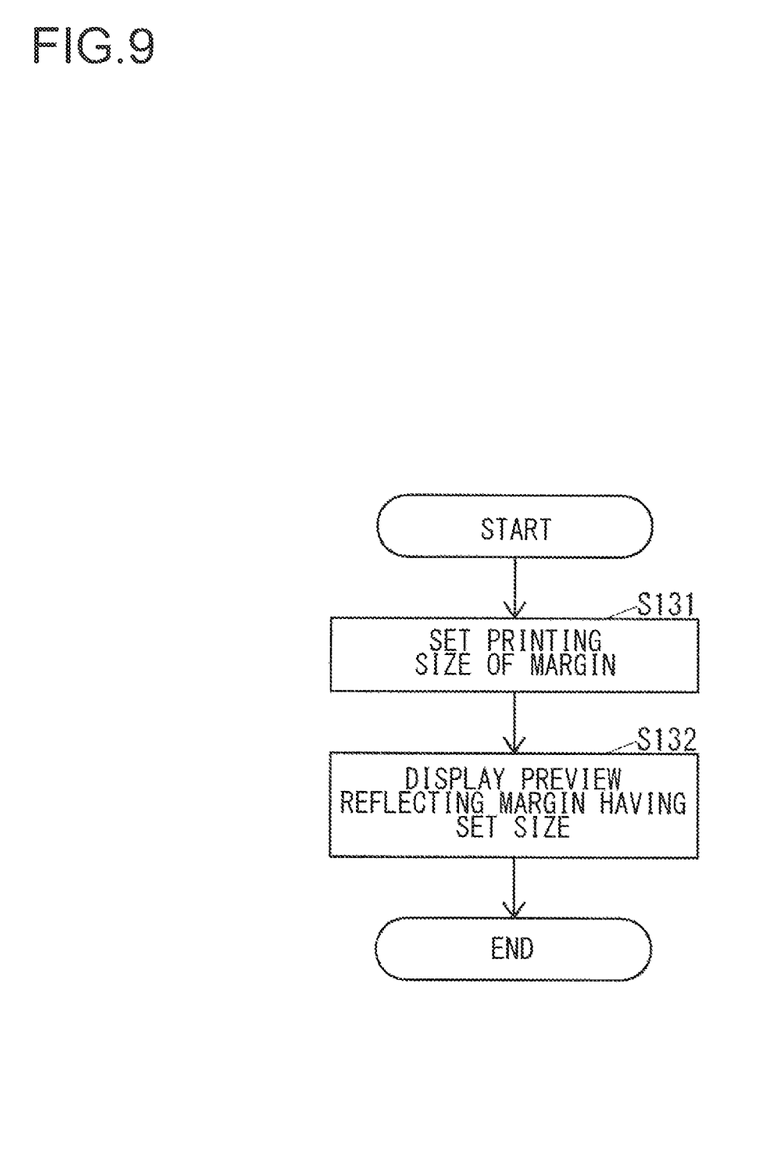
FIG. 9 shows steps of an operation performed by the processing performing unit shown in FIG. 1 when a left-to-right swipe operation performed with respect to the left end preview has been accepted.

FIG. 9 shows steps of an operation performed by the processing performing unit 18c when a left-to-right swipe operation performed with respect to the left end preview 40 has been accepted.

As shown in FIG. 9, when the operation accepting unit 18b has accepted the left-to-right swipe operation performed as shown in FIG. 8 with respect to the left end preview 40 displayed by the preview display unit 18a as shown in FIG. 6, the processing performing unit 18c sets, a size obtained by adding a size equivalent to an amount of movement in the swipe operation performed with respect to the left end preview 40 to a current size of the margin 32 on the left end, as a printing size of the margin 32 at the left end of the page as a target of the preview displayed on the preview screen 20 (S131).

Figure 10:
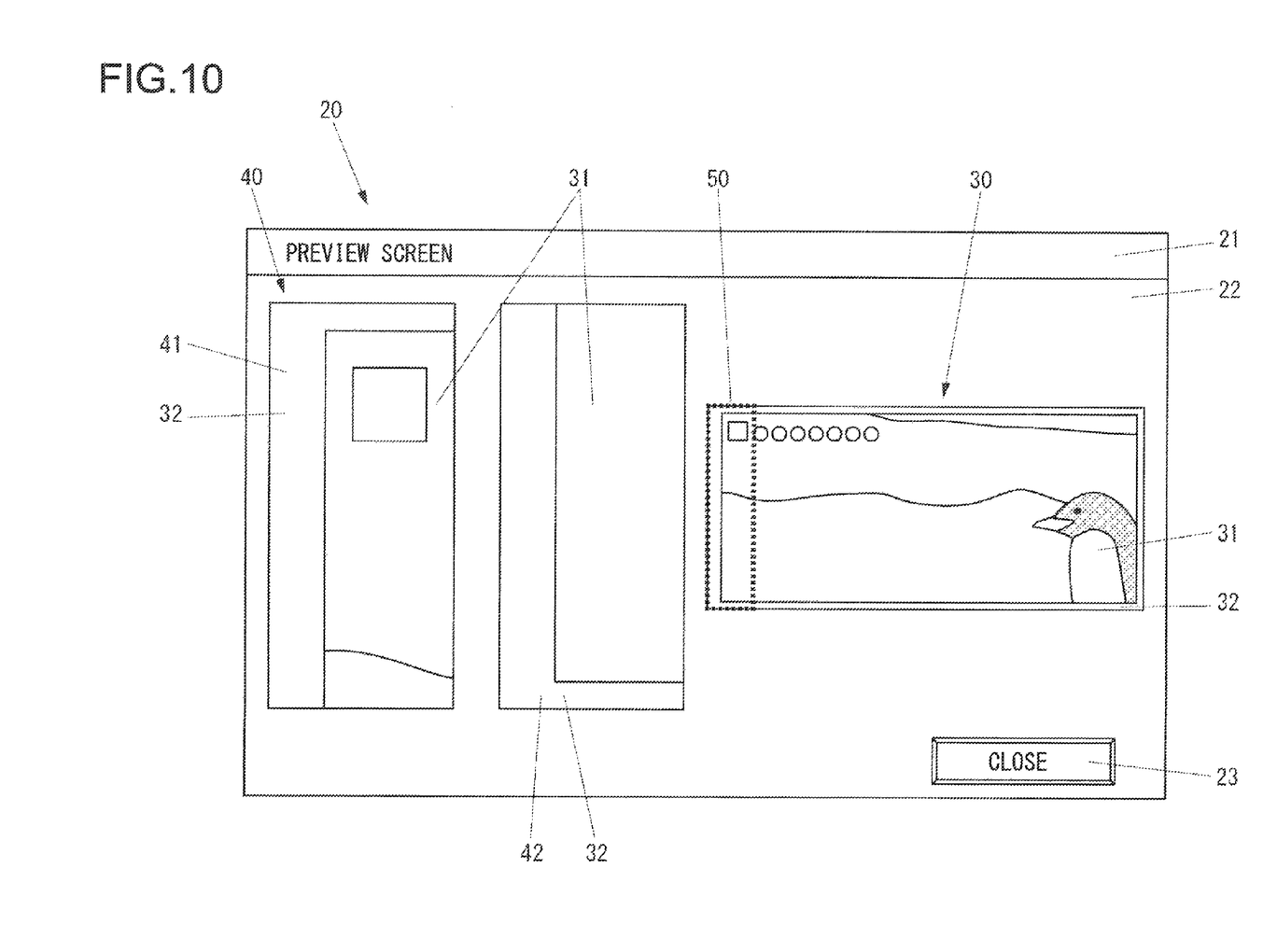
FIG. 10 shows an example of a preview screen displayed when the left-to-right swipe operation shown in FIG. 8 performed with respect to the left end preview has been accepted.

FIG. 10 shows an example of the preview screen 20 displayed when a left-to-right swipe operation performed with respect to the left end preview 40 has been accepted.

After the processing performed in S131, the processing performing unit 18c has the whole page preview 30 reflecting the margin 32 having the size set in S131 and the left end preview 40 displayed (on the display section) by the preview display unit 18a as shown in FIG. 10 (S132), and ends the operation shown in FIG. 9.

The above description has dealt with the case where a left-to-right swipe operation is performed with respect to the left end preview 40, but the same applies to cases where right-to-left, top-to-bottom, and bottom-to-top swipe operations are performed with respect to the left end preview 40. However, a right-to-left swipe operation is for reducing the printing size of the margin 32 at the left end of the page as a target of the preview displayed on the preview screen 20. When a top-to-bottom swipe operation is performed with respect to the upper-half block 41, the printing size of the margin 32 at the upper end is increased, and when a top-to-bottom swipe operation is performed with respect to the lower-half block 42, the printing size of the margin 32 at the lower end is reduced. When a bottom-to-top swipe operation is performed with respect to the upper-half block 41, the printing size of the margin 32 at the upper end is reduced, and when a bottom-to-top swipe operation is performed with respect to the lower-half block 42, the printing size of the margin 32 is increased.

Here, when a double-tap operation is performed with respect to the left end preview 40, the operation accepting unit 18b accepts the double-tap operation performed with respect to the left end preview 40.

Figure 11:
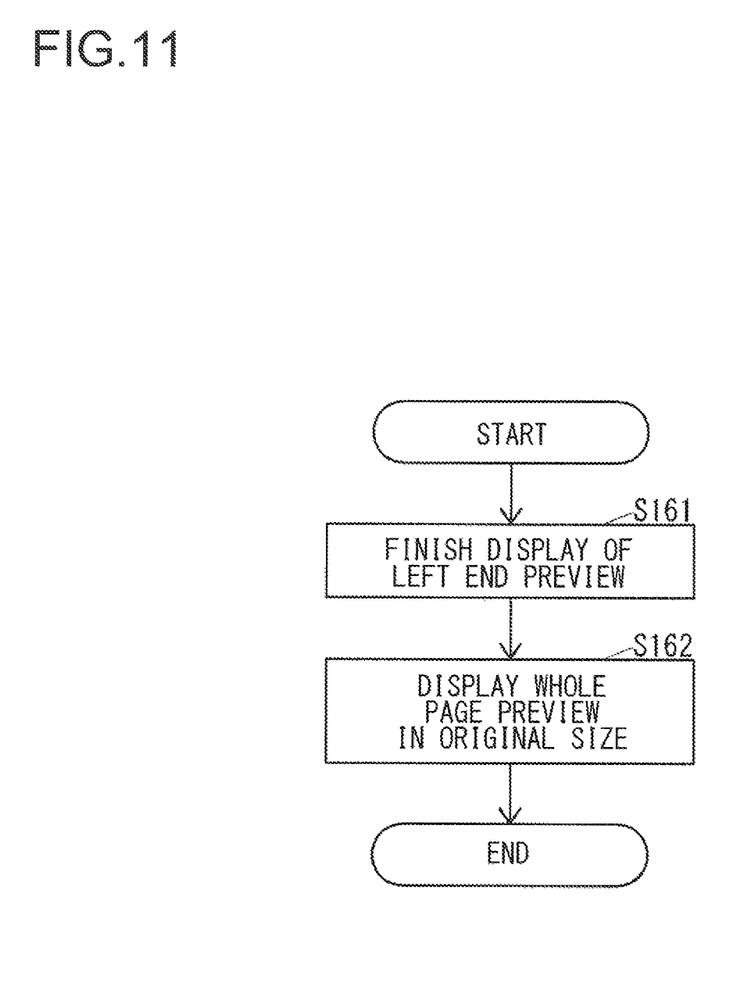
FIG. 11 shows steps of an operation performed by the processing performing unit shown in FIG. 1 when a double-tap operation performed with respect to the left end preview has been accepted.
Figure 12:
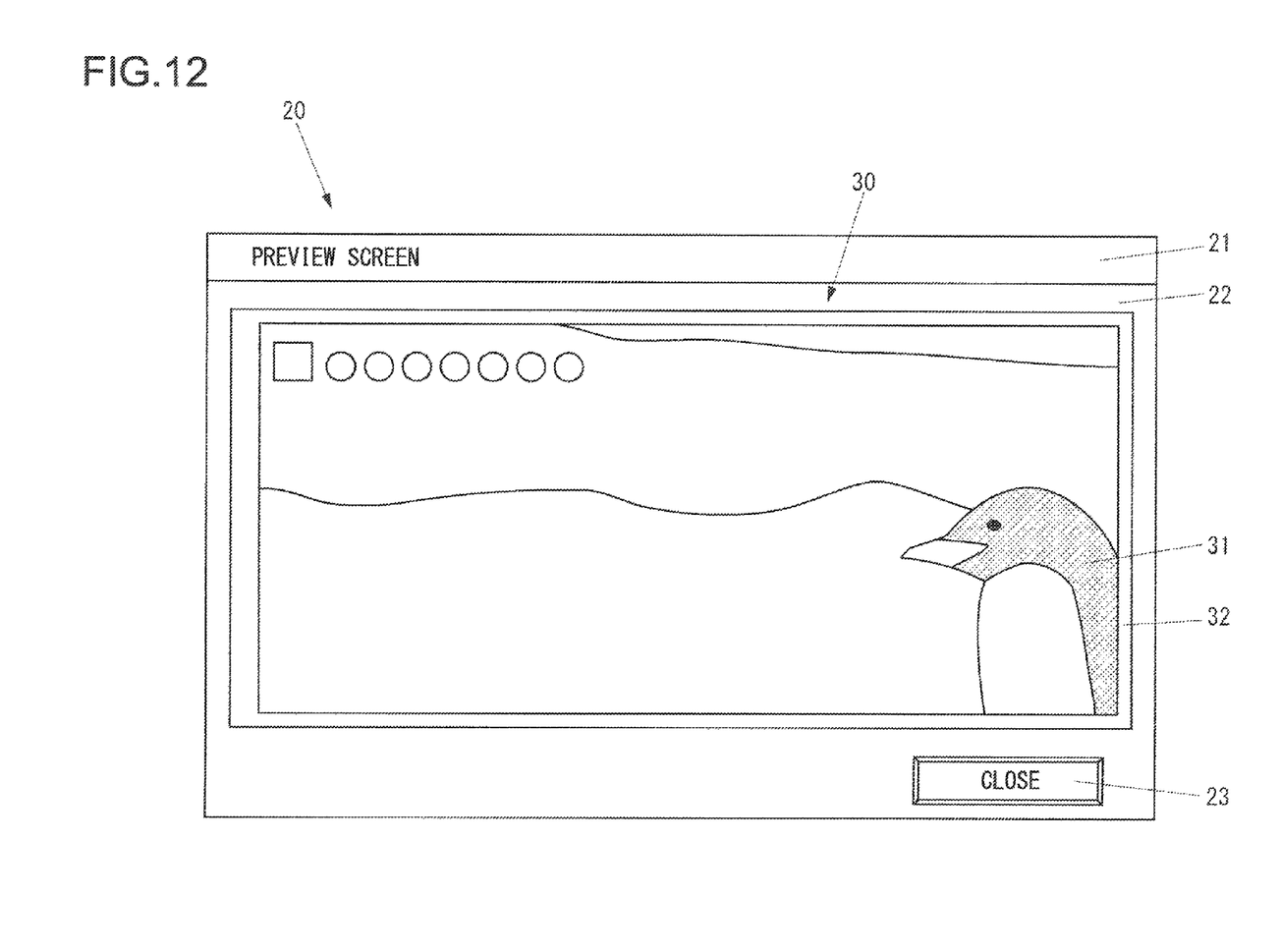
FIG. 12 shows an example of a preview screen displayed when the double-tap operation performed with respect to the left end preview shown in FIG. 10 has been accepted.

FIG. 11 shows steps of an operation performed by the processing performing unit 18c when a double-tap operation performed with respect to the left end preview 40 has been accepted. FIG. 12 shows an example of the preview screen 20 displayed when a double-tap operation performed with respect to the left end preview 40 has been accepted.

As shown in FIG. 11, when the operation accepting unit 18b accepts a double-tap operation performed with respect to the left end preview 40 that has been displayed as shown in FIG. 10 by the preview display unit 18a, the processing performing unit 18c has the display of the left end preview 40 finished by the preview display unit 18a (S161), and the processing performing unit 18c has the whole page preview 30 returned to its original size displayed by the preview display unit 18a as shown in FIG. 12 (S162), and ends the operation shown in FIG. 11.

The above descriptions have dealt with operations performed with respect to the left end region of the whole page preview 30, but the same applies to operations performed with respect to the upper, lower, and right end regions.

On receiving an input of a particular operation performed via the operation section 11, the MFP 10 performs printing of the image that has been displayed on the preview screen 20, by means of the printer 14 with the same setting of the margin 32 as has been displayed on the preview screen 20.

As described above, the MFP 10 displays the preview of a specific region at an end in the whole page preview of the page to be printed, that is, the whole page preview 30, for example, the left end preview 40 in an enlarged manner to be larger in size than the specific region at the end in the whole page preview 30 (S103 and S104), and when a margin specifying operation performed as a swipe operation with respect to the enlarged left end preview 40 has been accepted, the MFP 10 sets the size of the margin 32 specified in the margin specifying operation as the printing size of the margin 32 of the page as a target of the preview (S131), and displays the whole page preview 30 and the left end preview 40, both reflecting the margin 32 having the set size (S132); thus, it is possible to set the printing size of the margin 32 by making use of the left end preview 40 displayed in an enlarged manner.

Moreover, the MFP 10 accepts the above-described intuitive and natural operations performed with respect to a preview representing the image 31 to be actually printed, and thereby allows various confirmations regarding the image 31 and the setting of the margin 32 to be performed with a small number of steps. Thus, the MFP 10 does not require the user to learn dedicated operations for the various confirmations and the setting of the margin 32, and this makes the MFP 10 more user-friendly. In particular, as for the setting of the margin 32, the MFP 10 allows the user to set the margin 32 by means of the above-described intuitive and natural operations performed with respect to a preview while confirming the margin 32 in the preview, which represents the image 31 that is to be actually printed, and this contributes to improved user-friendliness of the MFP 10.

In the present embodiment, when a pinch-in operation is performed with respect to the operation region 33b on the left side, the MFP 10 displays the left end preview 40, but there may be adopted a configuration where a pinch-in operation concretely specifies a range of a particular end region to be displayed in an enlarged manner. That is, the MFP 10 may be configured such that a range of a quadrangle two opposite vertices of which are two points specified by a pinch-in operation at the beginning of the pinch-in operation is the range of the particular end region to be displayed in an enlarged manner.

In the MFP 10 of the present embodiment, the setting of the margin 32 can be performed separately with respect to the top, bottom, right, and left ends. However, in the MFP 10, the setting of the margin 32 for the top and bottom ends may be performed in a linked manner. For example, the MFP 10 may have a configuration where when the margin 32 is increased at the top end, the margin 32 is increased at the bottom end as well by the same amount by which the margin 32 is increased at the top end, and when the margin 32 is reduced at the top end, the margin 32 is also reduced at the bottom end by the same amount by which the margin 32 is reduced at the top end. Conversely, the MFP 10 may have a configuration where when the margin 32 is increased at the top end, the margin 32 is reduced at the bottom end by the same amount by which the margin 32 is increased at the top end, and when the margin 32 is reduced at the top end, the margin 32 is increased at the bottom end by the same amount by which the margin 32 is reduced at the top end. These descriptions are for the settings of the margin 32 at the top and bottom ends, but the settings of the margin 32 at the right and left ends may also be performed in a linked manner.

The MFP 10 displays the left end preview 40 such that the images of the upper-half block 41 and the lower-half block 42, which are made by dividing the image in the region at the left end of the region 33 in the up-down direction, are arranged side by side in the right-left direction, and thus, even when the display region 22 is shorter in the up-down direction than the image in the region at the left end of the region 33, the left end preview 40 can be displayed in an enlarged manner.

Here, the MFP 10 does not need to divide an image to be displayed in an enlarged manner if it is possible to display the image in an enlarged manner in the display region 22 without dividing the image.

Since the MFP 10 displays the reduced whole page preview 30, too, when the MFP 10 displays the left end preview 40 in an enlarged manner, it is possible to help the user easily recognize which part of the whole page preview 30 the left end preview 40 shows in an enlarged manner, and this contributes to improved user-friendliness. However, when displaying the left end preview 40 in an enlarged manner, the MFP 10 does not need to display the whole page preview 30 as well.

When there has been accepted a double-tap operation for ending the display of the left end preview 40 performed with respect to the left end preview 40 displayed in an enlarged manner, the MFP 10 finishes the display of the left end preview 40 (S161), and this contributes to improved user-friendliness.

Here, in the present embodiment, the operation performed for enlarged display is a pinch-in operation, but the operation for enlarged display may be an operation other than the pinch-in operation.

In the present embodiment, the operation performed for specifying the printing size of the margin is a swipe operation, but the operation for specifying the printing size of the margin may be an operation other than the swipe operation.

In the present embodiment, the operation performed for ending the display of the left end preview 40 is a double-tap operation, but the operation for ending the display of the left end preview 40 may be an operation other than the double-tap operation, such as a pinch-out operation. Further, in the present embodiment, the operation performed for ending the display of the left end preview 40 is performed with respect to the left end preview 40, but the operation for ending the display of the left end preview 40 may be performed with respect to the whole page preview 30 while the left end preview 40 is being displayed.

The MFP 10 may perform enlarged display of the preview of the center region 34 when an operation such as a pinch-in operation for enlarged display has been performed with respect to the center region 34 which is a center region surrounded by the region 33 which is an end region. However, since the preview of the center region 34 does not include the margin 32, the size of the margin 32 cannot be set by the operation performed with respect to the preview of the center region 34.

In the present embodiment, the image forming apparatus of the present disclosure is an MFP, but the image forming apparatus of the present disclosure may be an image forming apparatus other than an MFP, such as a printer, a copier, or the like as long as it is capable of displaying the preview of a page to be printed.

The image forming program 17*a* of the present disclosure is a program executed by an image forming apparatus (the MFP 10) in the present embodiment, but it may be a printer driver executed by a computer such as a personal computer (PC) that transmits printing data to the image forming apparatus. In a case where the image forming program 17*a* of the present disclosure is a printer driver, it is possible to set a margin in printing data generated by the printer driver by using an operation section and a display section of a computer.

As described above, when an operation for enlarged display has been performed with respect to a particular region at an end in a whole page preview displayed by the preview display unit 18*a*, and the operation accepting unit 18*b* has accepted the operation, the processing performing unit 18*c* included in the image forming apparatus (the MFP 10) of the present disclosure makes the preview display unit 18*a* display a preview of the particular region in an enlarged manner to be larger in size than the particular region in the whole page preview. Further, when a margin specifying operation for specifying a printing size of a margin of a page has been performed with respect to a preview of a particular region displayed by the preview display unit 18*a*, and the margin specifying operation has been accepted by the operation accepting unit 18*b*, the processing performing unit 18*c* sets the size specified in the margin specifying operation as the printing size of the margin of the page as a target of the preview, and makes the preview display unit 18*a* display at least one of the whole page preview and the preview of the particular region, both reflecting a margin having the set size.

With this feature, the image forming apparatus (the MFP 10) of the present disclosure displays the preview of the particular region at the end in the preview of the whole page to be printed in an enlarged manner to be larger in size than the particular region at the end in the whole page preview, and when a margin specifying operation has been performed with respect to the preview of the particular region at the end displayed in an enlarged manner and the margin specifying operation has been accepted, the image forming apparatus sets the margin size specified in the margin specifying operation as the printing size of the margin of the page and displays a preview reflecting a margin having the set size, and thus the printing size of the margin can be set by using the preview displayed in an enlarged manner.

In the image forming apparatus (the MFP 10) of the present disclosure, the preview display unit 18*a* may display the preview of the particular region be displayed by displaying images of a plurality of blocks made by dividing an image of the particular region in a particular direction to be arranged side by side in a direction perpendicular to the particular direction.

With this feature, the image forming apparatus (the MFP 10) of the present disclosure displays the preview of the particular region in such a manner that the images of the plurality of blocks made by dividing the image of the particular region in the particular direction are arranged side by side in the direction perpendicular to the particular direction, and this displays it possible to make the preview of the particular region in an enlarged manner even when the display region of the preview of the particular region is shorter than the image of the particular region in the particular direction.

Further, in the image forming apparatus (the MFP 10) of the present disclosure, when an operation for finishing the display of the preview of the particular region has been performed with respect to the preview of the particular region displayed by the preview display unit 18*a* and the operation has been accepted by the operation accepting unit 18*b*, the processing performing unit 18*c* may have the display of the preview of the particular region finished by the preview display unit 18*a*.

With this feature, the image forming apparatus (the MFP 10) of the present disclosure finishes the display of the preview of the particular region at an end when an operation for finishing the display of the preview of the particular region at the end is performed with respect to the preview of the particular region at the end displayed in an enlarged manner, and this contributes to enhanced user-friendliness.

The image forming program 17*a* of the present disclosure causes a computer to operate as the preview display unit 18*a* that displays, on the display device, the whole page preview of the page to be printed, the operation accepting unit 18*b* that accepts an operation performed via the operation device with respect to the preview displayed by the preview display unit 18*a*, and the processing performing unit 18*c* that performs processing corresponding to the operation accepted by the operation accepting unit 18*b*. When an operation for enlarged display has been performed with respect to a particular region at an end in the whole page preview that has been displayed by the preview display unit 18*a*, and the operation for enlarged display has been accepted by the operation accepting unit 18*b*, the processing performing unit 18*c* has the preview of the particular region displayed by the preview display unit 18*a* in an enlarged manner to be larger in size than the particular region in the whole page preview, and when a margin specifying operation for specifying a printing size of a margin of the page has been performed with respect to the preview of the particular region displayed by the preview display unit 18*a*, and the margin specifying operation has been accepted by the operation accepting unit 18*b*, the processing performing unit 18*c* sets the size specified in the margin specifying operation as the printing size of the margin of the page as a target of the preview, and also makes the preview display unit 18*a* display at least one of the whole page preview and the preview of the particular region, both reflecting a margin having the set size.

With this feature, the image forming method of the present disclosure, according to which processing is performed by means of the image forming program 17*a* configured as described above, displays the preview of a particular region at an end in the whole page preview of the page to be printed in an enlarged manner to be larger in size than the particular region at the end in the whole page preview, and when a margin specifying operation performed with respect to the enlarged preview of the particular region at the end, and the margin specifying operation has been accepted, the method sets a margin size specified in the margin specifying operation as a printing margin size for the page as a target of the preview and displays a preview reflecting a margin having the set size, it is possible to set the printing size of the margin by using the preview displayed in an enlarged manner.

Thus, with the image forming apparatus and the image forming method of the present disclosure, it is possible to set the printing size of a margin by making use of a preview displayed in an enlarged manner.

What is claimed is:

1. An image forming apparatus comprising:
a memory that stores an image forming program; and
a processor that executes the image forming program,
wherein
when the processor executes the image forming program, the processor
performs processing of displaying, on a display device, a whole page preview of a page to be printed,
performs processing of accepting an operation performed via an operation device with respect to the whole page preview displayed on the display device,
performs processing corresponding to the operation accepted,
performs, when, as the operation, an enlarging operation for enlarged display is accepted with respect to a particular region at an end in the whole page preview that has been displayed on the display device, processing of displaying on the display device a preview of the particular region in an enlarged manner to be larger in size than the particular region in the whole page preview, and
performs, when, as the operation a margin specifying operation for specifying a printing size of a margin of the page is accepted with respect to the preview of the particular region that has been displayed on the display device, processing of setting a size specified in the margin specifying operation as a printing size of the margin of the page as a target of the whole page preview, and processing of displaying on the display device at least one of the whole page preview and the preview of the particular region, both reflecting the margin having the size set by the processor, and
the margin specifying operation is a swipe operation performed with respect to the enlarged preview.

2. The image forming apparatus of claim 1,
wherein
when the processor executes the image forming program, the processor further performs processing of displaying the preview of the particular region on the display device by displaying a plurality of blocks made by dividing an image of the particular region in a particular direction to be arranged side by side in a direction perpendicular to the particular direction.

3. The image forming apparatus of claim 1,
wherein,
when the processor executes the image forming program, the processor further performs, when, as the operation, a finishing operation for finishing display of the preview of the particular region is accepted with respect to the preview of the particular region displayed on the display device, processing of finishing the display of the preview of the particular region.

4. The image forming apparatus of claim 1,
wherein the margin specifying operation increases and decreases the size of the margin along a direction of the swipe operation.

5. A non-transitory computer-readable storage medium storing an image forming program executable on a computer installed in an image forming apparatus,
wherein
when the computer executes the image forming program, the computer
displays, on a display device, a whole page preview of a page to be printed,
accepts an operation performed via an operation device with respect to the whole page preview displayed on the display device,
performs processing corresponding to an operation accepted by the computer,
when, as the operation, an enlarging operation for enlarged display is accepted with respect to a particular region at an end in the whole page preview displayed on the display device, displays on the display device a preview of the particular region in an enlarged manner to be larger in size than the particular region in the whole page preview, and
when, as the operation, a margin specifying operation for specifying a printing size of a margin of the page is accepted with respect to the preview of the particular region displayed on the display device, sets a size specified in the margin specifying operation as a printing size of the margin of the page as a target of the whole page preview, and displays on the display device at least one of the whole page preview and the preview of the particular region, both reflecting the margin having the size set by the computer, and
the margin specifying operation is a swipe operation performed with respect to the enlarged preview.

6. The non-transitory computer-readable storage medium of claim 5,
wherein the margin specifying operation increases and decreases the size of the margin along a direction of the swipe operation.

7. The non-transitory computer-readable storage medium of claim 5,
wherein
when the computer executes the image forming program, the computer further performs processing of displaying the preview of the particular region on the display device by displaying a plurality of blocks made by dividing an image of the particular region in a particular direction to be arranged side by side in a direction perpendicular to the particular direction.

8. The non-transitory computer-readable storage medium of claim 5,
wherein,
when the computer executes the image forming program, the computer further performs, when, as the operation, a finishing operation for finishing display of the preview of the particular region is accepted with respect to the preview of the particular region displayed on the display device, processing of finishing the display of the preview of the particular region.

* * * * *